UNITED STATES PATENT OFFICE.

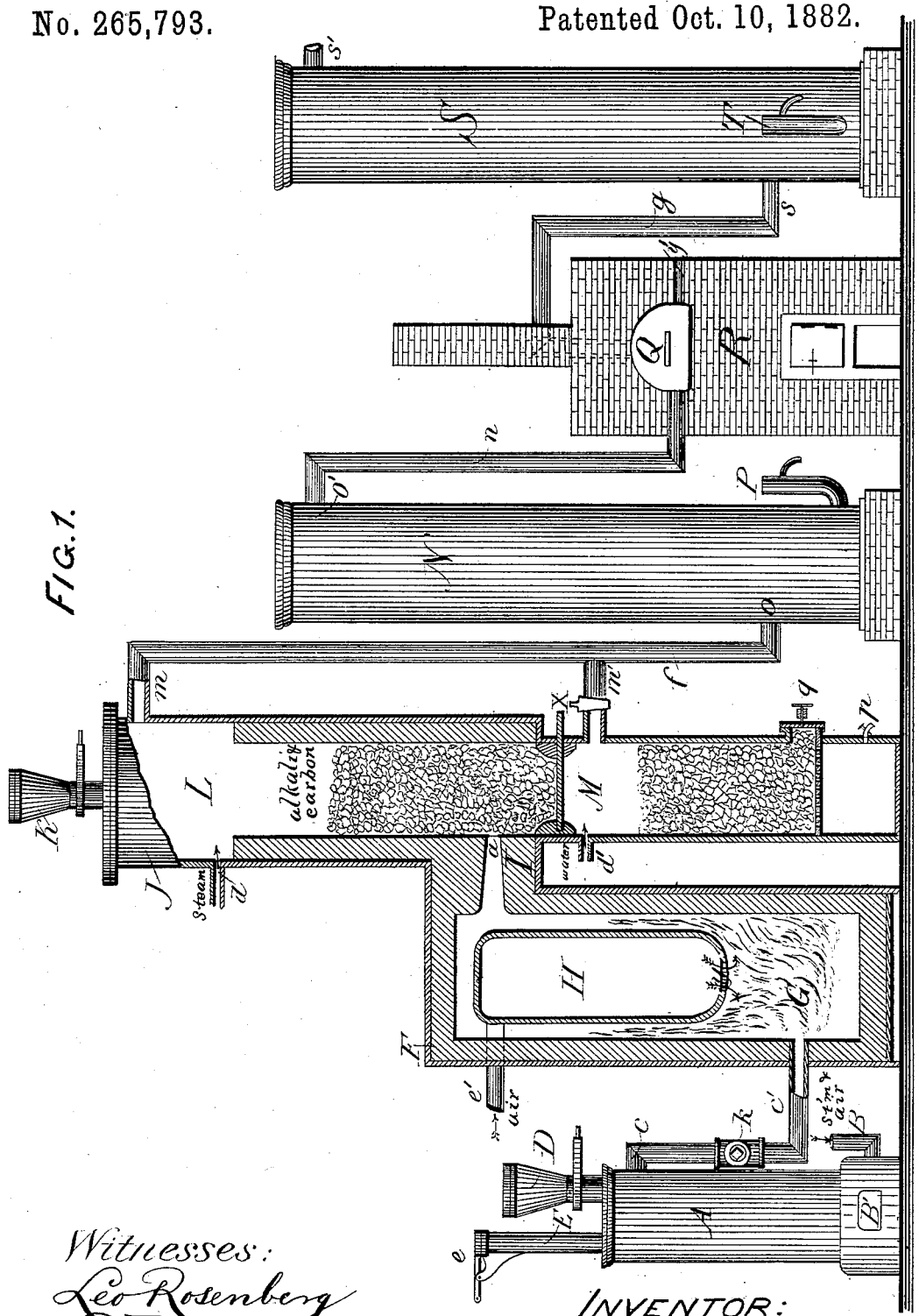

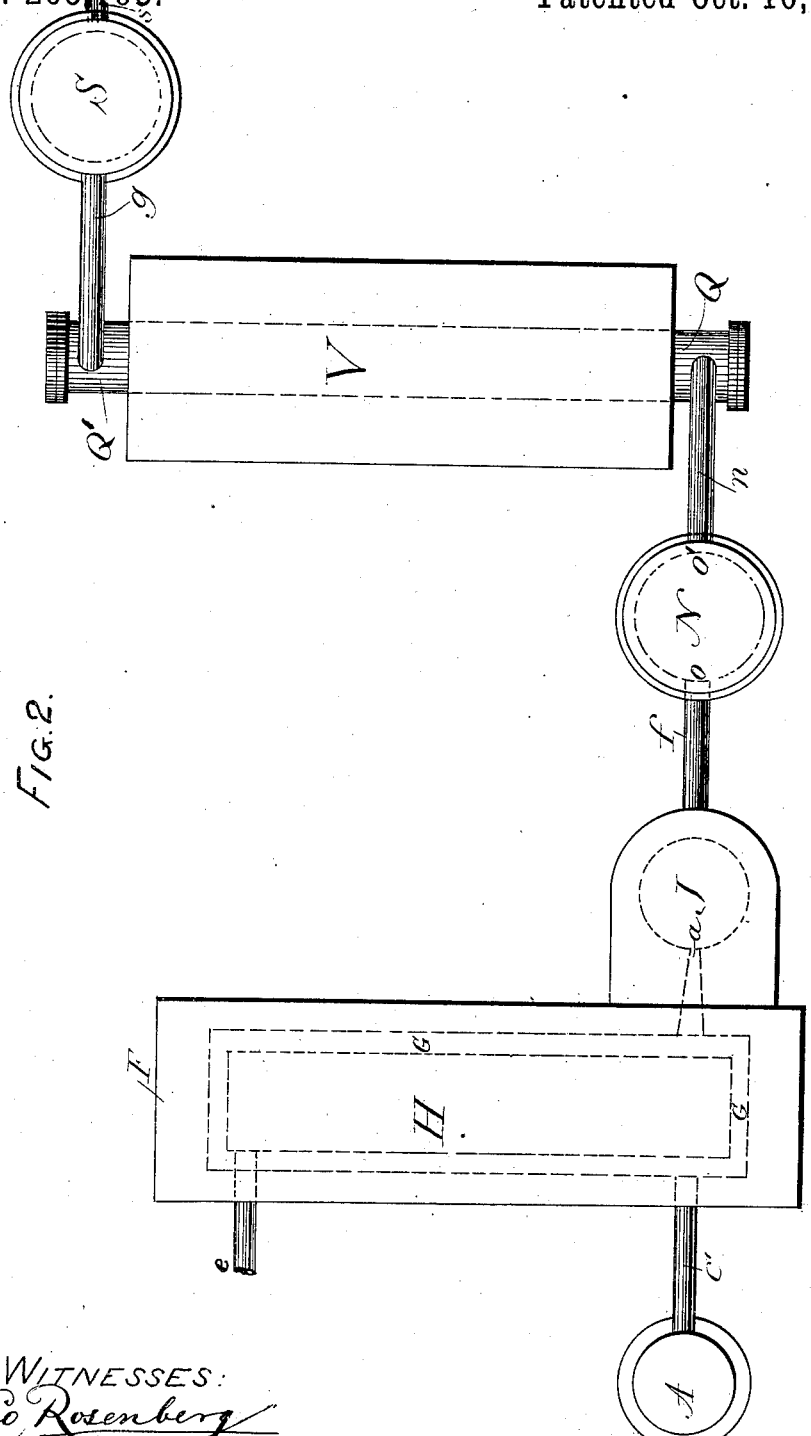

THOMAS B. FOGARTY, OF BROOKLYN, NEW YORK.

PROCESS OF MANUFACTURING GAS.

SPECIFICATION forming part of Letters Patent No. 265,793, dated October 10, 1882.

Application filed March 29, 1882. (No model.)

*To all whom it may concern:*

Be it known that I, THOMAS B. FOGARTY, of the city of Brooklyn, county of Kings, and State of New York, have invented a certain new and useful Process of Manufacturing Gas; and I hereby declare the following to be a full, clear, and exact specification of the same, reference being had to the accompanying drawings, forming part of this specification.

My invention relates to the manufacture of water-gas through the decomposition of steam and air by incandescent carbon generally, but more particularly to those processes of making water-gas in which steam and air are decomposed by incandescent carbon and the resulting gaseous mixture is freed from nitrogen and carbonic oxide by converting the former into cyanogen or some of its compounds or derivatives and the latter into carbonic acid, the last-named impurity being itself removed from the gas by means of ammonia.

The object of my invention is to cheapen the production of such gas, and at the same time to render the process more simple and practical.

I shall now proceed to describe my invention so fully and clearly that any person skilled in the art of making water-gas may be able to understand and practice the same; and for this purpose I shall divide or classify it into or under four different parts or heads, under which are described in detail the several sub-processes of a general process of manufacturing water-gas, and under the second of which parts or heads is particularly set forth and described the sub-process which constitutes the subject-matter of my invention. These four parts or heads consist, first, in the manufacture of a cheap heating-gas, chiefly consisting in nitrogen, hydrogen, carbonic oxide, and carbonic acid; second, in an improved process of converting the nitrogen in the crude gas into cyanogen or some compound or derivative thereof; third, in the conversion of the carbonic oxide in the crude gas, as well as that produced in the second part of my process, into carbonic acid by means of incandescent steam; fourth, in the purification of the gas from carbonic acid by means of ammonia.

Be it understood that when I speak of the removal of any impurity from the gas, or of the decomposition, combination, or conversion, of any of the substances or compounds contained therein or added thereto for the purposes of this invention, I speak only in a practical and limited sense, and not as referring to the absolute purification and conversion, which it is well known cannot be attained in practice.

Be it also understood that by the term "water-gas" I mean any gas produced by the decomposition of steam by incandescent carbon and capable of being applied to the production of light and heat, or of either of them.

I shall now proceed to describe in detail the several parts of my invention, their connection with each other and with the other parts of my invention not heretofore specified, and the manner of their combination to form a perfect and continuous process.

In carrying out the first part of my invention I force steam and air over or through a mass of incandescent carbon—such as coal, coke, or charcoal—contained in a close cupola, furnace, or retort of any suitable form or construction, and cause such incandescent carbon to decompose said steam and air and to combine with the oxygen thereof, giving rise to carbonic oxide and carbonic acid, the hydrogen of the steam and the nitrogen of the air being at the same time set free, and the whole forming what is known as a "heating" or "generator" gas, consisting chiefly of nitrogen, hydrogen, carbonic oxide, and carbonic acid. I call this cupola my "generator-furnace" and the gas produced by it "generator" gas.

In carrying out the second part of my invention I construct a cupola or furnace of any suitable form, but preferably as a vertical cylinder or cupola, divided into two chambers (upper and lower) by means of a suitable valve or other device answering to the same purpose. I call this my "alkali-furnace," and I distinguish its two chambers, the upper as the "cyanidizing" and the lower as the "ammonia" chamber, respectively. As far as possible I make my alkali-furnace gas-tight, and I construct it of any suitable material capable of standing intense heat, and with walls of thickness sufficient to prevent material loss of heat by radiation. The lower or ammonia chamber I construct of such form and dimensions as may be found most suitable for the performance of the functions for which it is designed; but I prefer to make it an upright vertical cylinder of a diameter corresponding to that of the interior of the upper or cyanidizing chamber, and without lining, or otherwise arranged so as to be capable of being rapidly cooled.

At a suitable height above the bottom of my cyanidizing-chamber I provide it with one or more suitable tuyeres and connect such tuyere or tuyeres in a suitable manner with a suitable combustion-chamber, to be hereinafter described. I also provide my cyanidizing chamber with a double hopper or other device suitable for supplying material to it. I provide it, too, with a suitable gas-outlet and a suitably-connected steam-pipe, and, if found necessary for the examination of its interior, with suitable sight-holes.

I provide my lower or ammonia chamber with a suitable gas-outlet and a suitably-connected steam or water pipe, preferably the latter. I place my gas-outlet at or near the top of the chamber, and near its bottom I place a perforated plate or set of grate-bars, which may serve as a false bottom to support the mass of alkalized carbon in the chamber, and at the same time may permit liquids to pass through into a space beneath. I also place just above the grate-bars a door suitable for withdrawing the contents of the chamber, and capable of being readily opened and closed and of being made gas-tight.

Between my generator and alkali furnaces I construct and place what I call my "superheater," which I can best describe as the combination of a combustion-chamber with superheating retorts or flues, in which air is superheated or rendered incandescent by the intense combustion of generator-gas and such superheated air in the combustion-chamber itself.

Having suitably connected my superheater with my generator-furnace upon one side and with my alkali-furnace upon the other, and having also closed the valve between the cyanidizing and ammonia chambers of the latter, I now proceed to charge the cyanidizing-chamber with coal, coke, charcoal, or some other form of carbon suitably mixed, compounded, or combined with alkali of some sort, or with some suitable mixture, compound, or combination of an alkali, preferably the carbonate of an alkali which parts readily with its acid.

The variety and form of carbon used, the manner in which it is mixed or compounded with the alkali, and the mode of introducing the mixed carbon and alkali into the retort are altogether matters of convenience and economy, for all the common varieties of carbonaceous fuel may be advantageously employed for the production of alkaline cyanides. It is, however, desirable that the carbon used, whether in the form of coke, coal, charcoal, or other carbonaceous fuel, should be mixed with the alkali as intimately as can practically be done, and that this alkalized carbon should be introduced into the furnace in as finely divided a state as may be consistent with the maintenance of a proper draft through it, with the view of presenting to the action of the incandescent nitrogen (as shall be hereinafter described) as large and as permeable a surface of alkalized carbon as can be practically done. For this reason the form in which the alkalized fuel is introduced into the furnace and the manner of its introduction must be varied according to the nature and condition of the material employed, the nature of this variation depending upon that of the alkali used equally as much as on that of the fuel. Thus when using coal, coke, or charcoal in lumps with alkaline earths—such as lime or barium—which do not contain water of crystallization, the fuel and alkali must be placed directly in the furnace without any previous preparation; but when coke, charcoal, peat, or other porous fuel is used with an alkali containing water of crystallization the alkali may be dissolved in its own water, when the fuel may be soaked in it, and afterward dried before being placed in the furnace. When the fuel used is in the form of fine coal, coke, or peat mixed with coal-tar these substances should be intimately mixed with the alkali, which in this case should be one containing no water of crystallization, and should be molded or otherwise formed into small lumps or bricks before being placed in the furnace. When, however, the fuel used is in the form of coal-dust, breeze, or broken peat, or in any other form in which, if placed in mass in the furnace, it would obstruct the passage of the incandescent nitrogen gas, it should be ground to a powder, and, having been intimately mixed with the alkali, the mixture should be dusted or injected or fed into the furnace in some other manner gradually and continuously. In like manner, when the fuel used is in the form of a hydrocarbon gas or vapor or of carbonic oxide, it should be allowed to pass through the retort or furnace along with the nitrogenous gas intended to be acted upon, in which case the alkali used should be dusted or injected into the furnace in the form of powder. Indeed it is more than probable that the carbonic oxide of the crude gas itself at all times enters largely into the reactions which take place within the alkali-furnace. I now introduce my generator-gas into the combustion-chamber of the superheater, wherein it mixes with a volume of air that has been raised to incandescence in passing through one or more of the highly-heated retorts or flues of the superheater, whereupon the air and gas enter into intense combustion, whereby the superheater itself is raised to and maintained at an intense heat. I now cause the incandescent products of combustion to pass through the tuyere already described into the cyanidizing-chamber, through which they pass, imparting by contact their own high temperature to the alkalized carbon contained therein, quickly raising it to an intense heat, and at the same time furnishing to it, in a highly-incandescent state, an equivalent of nitrogen, wherewith it may combine to form cyanides and cyanates of the alkali used, as it immediately does. The gaseous products of the cyanidizing-chamber, consisting of generator-gas practically free from nitrogen, mixed with cyanogen or gaseous compounds or vapors thereof, or of the alkali used in the process, now ascend to the upper part of the cyanidizing-chamber, which is not entirely filled with alkalized carbon, but contains above the latter a large space of such a height and so constructed that the upper part thereof will be sufficiently removed from the influence of the heat to maintain a temperature capable of promoting mutual decomposition and transposition of elements between the cyanidized products of the chamber and an equivalent of steam, which is admitted, preferably in excess, to the top of the cyanidizing-chamber, and at the temperature most favorable, as found by experience, to such decomposition and transposition of elements, the products thereof being oxides of carbon and ammonia, which escape from the cyanidizing-chamber through a pipe or other suitable conduit, and thence to a suitably-constructed condenser or scrubber or other cooling apparatus, in passing through which they become thoroughly mixed and broken up, and being, moreover, brought into intimate contact with cool wet surfaces, have their temperature reduced sufficiently to admit of the combination of ammonia and carbonic acid, which always takes place with the production of carbonates of ammonia when these gases are brought together at low temperatures and in the presence of water, such combination being further promoted by the contact with the cool moist surfaces of the obstructions wherewith the scrubber is filled, and whereby the gas is broken up and cooled in passing through the scrubber.

When the alkalized carbon in the cyanidizing-chamber has been submitted to the action of the incandescent nitrogen contained in the products of combustion for a sufficient time, I open the valve between it and the ammonia-chamber beneath and permit the alkalized carbon, now strongly impregnated with alkaline cyanides and cyanates, to fall from the upper into the lower chamber, into the upper part of which I suitably inject a little water, preferably in a finely-divided state, and this, falling on the upper surface of the incandescent cyanidized mass in the chamber, cools it gradually from the top downward, and as it does so simultaneously decomposes the cyanides and cyanates present, being at the same time itself decomposed by them, and a mutual transposition of elements taking place, the hydrogen of the water in part and the nitrogen of the cyanidized alkali uniting to form ammonia, while the oxygen of the water and the carbon of the cyanogen combine to form carbonic oxide and carbonic acid, the alkali being set free or entering into fresh combinations.

The gaseous products of the above double decomposition escape through a suitable outlet placed at or near the top of the chamber, and thence through a suitably-connected pipe into a suitable scrubber or condenser, wherein the ammonia and carbonic acid present combine to form carbonates of ammonia, as already described, the remaining gaseous products joining and mingling with the other combustible gases. The ammoniacal compounds produced in the scrubbing process are very soluble, and are dissolved in the water passing through the scrubber.

When I find upon examination that ammonia practically ceases to be evolved from the crude alkaline mass in the ammonia-chamber I remove it through the door above the perforated grate or bottom, and, having dried it in any convenient manner, but preferably by the waste heat of the superheater, I charge it into the cyanidizing-chamber and use it over again, as before, adding, when needed, a little alkali to compensate for waste in the process.

When the ammonia-chamber is about to be opened for the purpose of withdrawing the spent material care should be taken to close the communication between it and the cyanidizing chamber upon one side and the scrubber on the other by means of a suitable valve or other equivalent device.

I shall now describe the third part of my invention, which relates to the further purification of the gas by the conversion of its carbonic oxide into carbonic acid, with the liberation of a volume of hydrogen equal to that of the carbonic oxide removed. My gaseous products being freed from ammonia, and consisting chiefly of hydrogen, carbonic oxide, carbonic acid, and such nitrogen as may have escaped combination and conversion, are now caused to pass through one or more highly-heated retorts or chambers, in which they are brought into intimate contact with incandescent steam, when the steam is decomposed by the carbon of the carbonic oxide, giving rise to a volume of carbonic acid equal to that of the decomposed oxide, and at the same time setting an equal volume of hydrogen free.

The fourth part of my invention relates to the purification of the gas from carbonic acid and sulphureted hydrogen. For the purpose of purifying my gas from carbonic acid and sulphureted hydrogen, I avail myself of the great quantity of ammonia resulting from the conversion thereinto of the nitrogen of the gas itself, as described in that part of this specification which relates to the second part of my invention, and by means of scrubbers or other suitable apparatus, and under suitable conditions of moisture and temperature, I bring it (the ammonia) into intimate contact with the carbonic acid and sulphureted hydrogen of the gas and cause it to combine therewith and to form commercial salts, which may be readily separated and collected. Whenever the ammonia in the gas is insufficient in quantity for its purification from the contained carbonic acid and sulphureted hydrogen at one operation I recover or regenerate it by any of the well-known processes, and so am able to use it over and over again for the removal of additional volumes of these impurities until they are entirely removed from the gas.

In the drawings, Figure 1 is a view, partly in section and partly in elevation, of my improved apparatus. Fig. 2 is a plan of the same.

A is a cupola or furnace, suitably provided with an air and steam inlet, B, a gas-outlet, C, a hopper, D, a chimney, E, and a chimney valve or cover, e.

F is a superheater, suitably provided with a combustion-chamber, G, a retort or flue, H, suitably arranged in the superheater F and connected to the furnace or cupola A by the pipe c'.

J is an alkali-furnace, suitably provided with the hopper K, steam-pipe d, and water-pipe d', and outlets m and m', having the cyanidizing-chamber L and the ammonia-chamber M, separated by a suitable valve, X, and outlets suitably connected by a pipe, f, to the inlet of a scrubber, N.

N is a scrubber having its inlet O, outlet O', and overflow P, and connected by the pipe n to the inlet Q of a retort, V, set in a suitable furnace, R.

V is a retort set in a suitable furnace, provided with its inlet n, outlet g, and steam-pipe y'.

R is a furnace containing a retort, V, suitably connected at its outlet Q' by a pipe, g, to a scrubber, S.

S is a suitably-constructed scrubber, connected at its inlet s by a pipe, g, to a retort, V, and at its outlet s' to a gas-holder or suitable intervening apparatus.

The mode of operation is as follows: I open the door B' and chimney-valve e of the cupola A, and, having filled the cupola to a suitable depth with coal, coke, charcoal, or any other suitable form of carbon, I ignite it and allow it to burn until it becomes incandescent, at least to a considerable extent. I now, by means of a suitable jet, pump, or aspirator, force suitably-adjusted volumes of steam and air into the ash-pit of the cupola through the pipe B, suitably connected thereto. As soon as the mingled stream of steam and air meets the incandescent fuel in the cupola the steam becomes decomposed with a slight explosion and flames issue from the furnace-door B', which may now be closed. The mingled stream of steam and air is now forced upward through the mass of incandescent fuel in the cupola, through the open chimney of which it escapes as a generator-gas, the hydrogen and nitrogen of the steam and air passing over unchanged, while their oxygen combines with the carbon of the coal or other fuel to form carbonic oxide and carbonic acid in proportions which vary according to the relative proportions of steam and air, the temperature of the furnace, and the greater or less depth of the contained incandescent fuel. The generator-gas also contains some sulphurous impurities and a large volume of undecomposed steam.

For the purposes of my invention it is desirable that my generator-gas should contain as much carbonic oxide and as little carbonic acid as possible, and for this reason it is desirable to keep the body of fuel in the cupola of such a depth that all or nearly all of the carbonic acid produced in the lower part of the fire may be decomposed and converted into carbonic oxide by the incandescent fuel in the upper part of the cupola, as happens when carbonic acid is passed through incandescent carbon, and as indeed is the usual practice of the manufacturers of water-gas. The production of generator-gas in the cupola will now be uniform and continuous if care be taken to replenish and clean the fire at proper intervals. Its quality, too, will be pretty constant and uniform if the relative volumes of steam and air are suitably adjusted.

As it is desirable to heat the superheater F to an extremely-high temperature, I find it advantageous to do so by means of generator-gas, which I accordingly admit to the combustion-chamber by opening the cock k on the pipe C', taking care to light the gas immediately upon its entering the chamber, so as to avoid explosion. The air to support combustion in the chamber G is forced or drawn through the pipe e', and, passing through the flue or retort H, enters the combustion-chamber at y, and as the flue becomes hotter is itself more highly heated in passing through it. At the same time the intensity of the combustion in the chamber increases in the same ratio, and this mutual and reciprocal reaction between the superheated air in the flue and the intensity of the combustion in the chamber continues until an exceedingly high temperature is attained. The superheater having attained a good working heat, I now proceed to charge my alkali-furnace J as follows: I first close the valve X between the chambers L and M, and through the hopper K I introduce into the cyanogen-chamber L a suitable quantity of coal, coke, charcoal, or some other suitable form of carbon suitably mixed, compounded, or combined with an alkali or some suitable form, compound, or combination of an alkali. Now, the mass of alkalized carbon becomes quickly heated to incandescence by the products of combustion, which escape from the superheater F through the tuyere a into the cyanidizing-chamber L, wherein they impart their own high temperature to its contents, and whence they pass through the scrubbers and other parts of the apparatus to the gas-holder. Under the influence of the intense temperature to which they are raised by the incandescent products of combustion passing through the cyanidizing-chamber the carbon and alkali contained therein combine with the nitrogen contained in the incandescent products of combustion to form cyanogen and compounds thereof, principally cyanides and cyanates of the alkali used, some sulphocyanogen being also produced from the combination of sulphurous impurities with the cyanogen, some of the cyanogen products thus formed being gaseous and others solid. Consequently the economical working of the process renders it imperative that provision should be made for obtaining and utilizing both classes of products.

For the purpose of preserving and converting into ammonia free cyanogen and such of its compounds as escape from the mass of alkalized carbon in a gaseous state and as are capable of being decomposed by steam, I admit a regulated volume of steam, preferably in excess of the combining equivalent of the cyanogen, at a suitable temperature, to the chamber L, where it mixes with the cyanidized gaseous products escaping from the mass of alkalized carbon and decomposes them with the production of hydrogen, oxides of carbon, and ammonia. As the success of the process is nearly, if not altogether, dependent upon the maintenance in the upper part of the cyanidizing-chamber of a suitable temperature, I am careful that the size of the upper or decomposing part of the chamber, its proximity to or remoteness from the incandescent mass of alkalized carbon in the lower part of the chamber, the temperature of the steam admitted through the pipe $d$, and also its volume, are suitably adjusted to the requirements of the process. The greater part of the cyanidized products formed in the cyanidizing-chamber is found in the mass of incandescent cyanidized carbon remaining in the chamber, and I now proceed to utilize these also by converting them into ammonia and other salable products. I permit the alkalized carbon to remain in the cyanidizing-chamber as long as I consider necessary for the cyanidizing of the alkali, generally about three hours, more or less, when I open the valve X between L and M and allow the cyanidized mass to fall into the lower or ammonia chamber, and then, having closed the valve X between the two chambers and charged the upper one afresh with alkalized carbon by means of the hopper K, I proceed as before. It must be evident that the operation of cyanidizing the alkalized carbon may be made intermittent or continuous at will, according as the chamber L is wholly or partially emptied and charged at stated intervals. By means of the pipe $d'$, I now throw a suitably-regulated spray of water upon the incandescent mass of cyanidized carbon and alkali in the chamber M. At first some of the water is decomposed by the incandescent carbon; but this effect ceases almost immediately, the gases produced being carbonic oxide, carbonic acid, and hydrogen, with a little ammonia. As soon, however, as the surface of the mass of cyanidized carbon becomes cooled to a point at which it is no longer capable of decomposing the water, or, rather, the steam produced by it, the hot steam immediately lays hold of and decomposes the cyanides and cyanates present in the upper strata of carbon, which are now at a temperature just suited to the production of ammonia, and is itself decomposed by the cyanides and cyanates, the hydrogen of the steam combining with the nitrogen of the cyanidized alkali to form ammonia, while its oxygen unites with the carbon of the cyanogen to produce carbonic oxide and carbonic acid, principally the latter, the alkali being set free or entering into fresh combinations.

It will be readily perceived that in the above-described process of converting the cyanidized products of the incandescent alkalized mass into ammonia the cooling process proceeds, from the top downward through the mass, which, if the operation be carefully conducted, will be cooled at top so low as to be incapable even of producing steam, while its center may be at a temperature suitable to the production of ammonia, and the bottom of the mass may still be in a highly incandescent state and fully capable of decomposing the steam, and producing thereby combustible gases. A self-evident advantage of this process of converting the cyanidized alkali into ammonia is that as the ammoniacal gas escapes it passes through the upper strata of the mass, which are always at a temperature much lower than that at which it has been produced, and consequently are incapable of decomposing or injuring it.

It must be also perceived that by continuing the ammonia producing and cooling process just described the mass of alkalized carbon in the chamber M becomes gradually cooled throughout to such an extent that it is no longer capable even of producing steam. When this occurs the water thrown upon the mass filters through it and passes off at the cock $p$, which thus furnishes an excellent indication of the termination of the production of ammonia. The man in charge also soon learns, by opening a cock placed at any convenient point upon the outlet from the ammonia-chamber, whether ammonia is passing off or not. The charge in the ammonia-chamber, having been worked off sufficiently, must now be removed through the door $q$ and dried in any convenient manner, when it will be ready to be returned to the cyanidizing-chamber for the production of a fresh charge of cyanidized alkali, and thus the operation may be repeated over and over again until the carbon is almost entirely consumed. Before returning the spent mass to the cyanidizing-chamber it is often necessary to add a little fresh alkali to it in order to compensate for waste in the process. When the alkalized carbon withdrawn from the ammonia-retort appears to be consumed so far as to be unfit for use for the production of cyanogen I throw it into a solution of a salt of iron and produce a ferrocyanide of the alkali used. The generator-gas, having been deprived of its nitrogen in passing through the incandescent carbon in the alkali-furnace, and consisting principally of hydrogen, carbonic oxide, carbonic acid, and free ammonia, escapes from the chamber L through its outlet $m$, and, passing through the pipe $f$, meets the ammoniacal gas produced in M at $m'$, and, accompanied by and mixed with it, enters at O into the scrubber N, through which it passes slowly, and in which it is continually broken up by and brought into contact with the cool wet surfaces of coke, brush, slats, or other obstructions with which the scrubber is filled, and over or through which water or other liquid is caused to trickle slowly. The consequence of this scrubbing process is that the gas attains a low temperature, and the ammonia, taking up its equivalent of carbonic acid, combines therewith to form carbonates of ammonia, which are immediately dissolved by the liquid passing through the scrubber, and are carried off by it through the overflow P.

When the carbonic acid is in excess of the volume required for the production of monocarbonate of ammonia, as it is desirable that it should be, and as, indeed, it usually is, the excess enters into combination with and converts into bicarbonate its equivalent of the monocarbonate. The gas thus freed from nitrogen, ammonia, and carbonic acid now escapes from the scrubber N through its outlet O', and, passing through the pipe $n$, enters the retort or chamber V at Q, where it meets with a volume of steam, preferably superheated, supplied from any suitable source by the pipe $y$. This steam now mixes with the gas, and the combined volume being raised to a high state of incandescence in passing through the retort, the steam becomes decomposed by the carbonic oxide of the gas, its oxygen combining therewith and converting it into carbonic acid and its hydrogen being set free and going to swell the volume of the combustible gases. The gas now requires to be again purified from carbonic acid, and this I effect, as before, by causing it to pass from the retort V through a pipe, $g$, into a scrubber, S, which it enters at $s$, and in which it meets, as before, with a volume of ammonia, which has meanwhile been regenerated or recovered, and which has been caused to enter the scrubber through a suitable connection. (Not shown in the drawings.) The gas now again passes slowly upward through the scrubber in company with the ammonia, and, both gases being thoroughly mixed and broken up, as before, and being, moreover, subjected to cooling influences and to the contact of wet surfaces, the ammonia again takes up its equivalent of carbonic acid, the resulting carbonates being dissolved in liquid, which is caused to trickle slowly through the scrubber, as before. The gas may yet require to be freed from sulphurous and other impurities incapable of being removed by ammonia; but this having been effected by submitting it to the ordinary iron or lime purifications, it is now in a proper condition for use as a heating agent for either domestic or manufacturing purposes. However, it still requires to be suitably carbureted or enriched with hydrocarbon gases or vapors before it becomes capable of being used for the ordinary purposes of illumination. As, however, there are various well-known processes for effecting this, and as, moreover, they have no connection with my invention, except incidentally, it is unnecessary to do more than to allude to them.

I do not bind or confine myself to the exact processes or succession of processes or to the exact form of the apparatus described, for it is very evident that in a continuous and extended process like my invention the several processes and details and the exact order and succession of the same may be varied indefinitely, the same being true of the form, construction, and arrangement of the apparatus used.

I hereby disclaim as a part of this invention the process of heating the mass of carbon and alkali (used in extracting nitrogen from the crude gas) and producing cyanides which consists in superheating the crude gas and then passing it in an incandescent state through the mass of carbon and alkali, as described and claimed in my application for a patent filed March 14, 1882.

I also disclaim, in a process for manufacturing gas through the decomposition of steam and air by incandescent carbon and for purifying such gas from nitrogen by converting the latter into cyanogen or alkaline cyanides or cyanates, the process of decomposing such cyanogen and its gaseous compounds by steam in the same chamber or furnace in which they are formed and the solid compounds of cyanogen in a separate chamber by steam, substantially as described and claimed in my application for a patent filed March 14, 1882.

I also disclaim, in an apparatus for the manufacture of gas and ammonia, the furnace J, suitably divided into the chambers L and M, the former provided with a suitable steam-pipe, $d$, and the latter with a water-pipe, $d'$, and both having induction and eduction pipes for gas, as described and claimed in my application for a patent filed March 14, 1882.

What I claim, and desire to secure by Letters Patent, is—

In the manufacture of gas through the decomposition of steam and air by incandescent carbon, the process of freeing the gas from nitrogen and forming cyanogen and cyanides, which consists in, first, producing carbonic oxide and hydrogen in a generator-furnace; second, burning the gas so produced in a combustion-chamber; third, passing the incandescent products of such combustion through carbon and alkali contained in a suitable retort, causing the nitrogen in the products of combustion to combine with such carbon and alkali and to produce cyanogen, substantially as described.

In testimony whereof I have signed my name to this specification before two subscribing witnesses.

THOS. B. FOGARTY.

Witnesses:
EDWIN F. CAREY,
JOHN B. SIMPSON.